United States Patent [19]

Ismert

[11] Patent Number: 5,054,741
[45] Date of Patent: Oct. 8, 1991

[54] MULTIPLE SIZE TUBING HANGER

[75] Inventor: Joseph P. Ismert, Kansas City, Mo.

[73] Assignee: Sioux Chief Manufacturing Co., Inc., Peculiar, Mo.

[21] Appl. No.: 598,363

[22] Filed: Oct. 15, 1990

[51] Int. Cl.$^5$ ............................................... F16L 3/08
[52] U.S. Cl. .................................... 248/74.5; 248/67.5
[58] Field of Search ................... 248/74.5, 74.1, 74.2, 248/67.5, 67.7, 69, 65, 73, 49, 71, 500, 510, 68.1; 24/545; 174/157, 156

[56] References Cited

U.S. PATENT DOCUMENTS

| 2,570,957 | 10/1951 | Lee . | |
|---|---|---|---|
| 3,016,220 | 1/1962 | Rose . | |
| 3,430,905 | 3/1969 | Pepe . | |
| 4,260,123 | 4/1981 | Ismert . | |
| 4,588,152 | 5/1986 | Ruehl et al. . | |
| 4,826,111 | 5/1989 | Ismert . | |
| 4,842,237 | 6/1989 | Wollar | 248/73 X |
| 4,903,920 | 2/1990 | Merritt . | |
| 4,903,921 | 2/1990 | Logsdon . | |
| 4,936,530 | 6/1990 | Wollar | 248/71 |
| 4,961,554 | 10/1990 | Smowton | 248/74.1 X |
| 4,971,272 | 11/1990 | Gudridge et al. | 248/74.5 |
| 4,978,090 | 12/1990 | Wichert et al. | 248/74.1 |

FOREIGN PATENT DOCUMENTS

| 2353055 | 5/1974 | Fed. Rep. of Germany | 248/74.5 |
|---|---|---|---|
| 1315952 | 5/1973 | United Kingdom | 248/74.5 |

Primary Examiner—Ramon O. Ramirez
Attorney, Agent, or Firm—Wm. Bruce Day

[57] ABSTRACT

A tube hanger for selectively supporting at least two different sizes of tubes from a mounting surface comprises a unitary body of flexible, resilient material having a body portion sized to extend transversely across a tube to be supported by the hanger. The body portion has a base end generally for abutment with a support surface and an arm with a tip end extending outwardly from the base end in a semi-circular arc segment. The arm defines a partially enclosed cavity sized for receipt of a first size of tube, such as ⅞ inch o.d. tubing. A supplemental finger extending outwardly from the arm and into the cavity substantially concentrically with the arm cradles and grips a second size of tube of lesser diameter than the first size of tube. The tube hanger snap-fits and snugly maintains its position about both sizes of tubing for one handed installation, freeing the installer from having to hold the hanger about the tubing while fastening the hanger to a support, such as an overhead joist. A channel extends through the body portion of the tube hanger with a fastener preloaded into the channel.

7 Claims, 2 Drawing Sheets

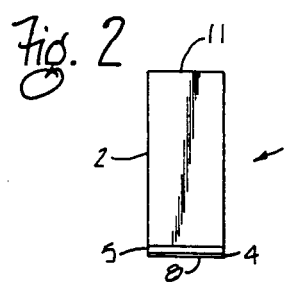
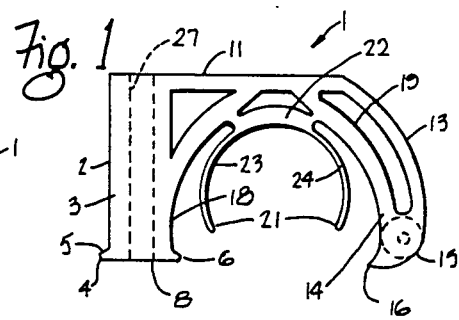
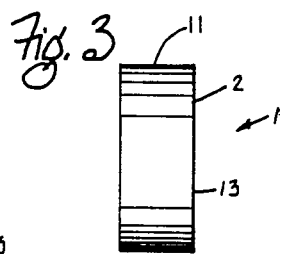
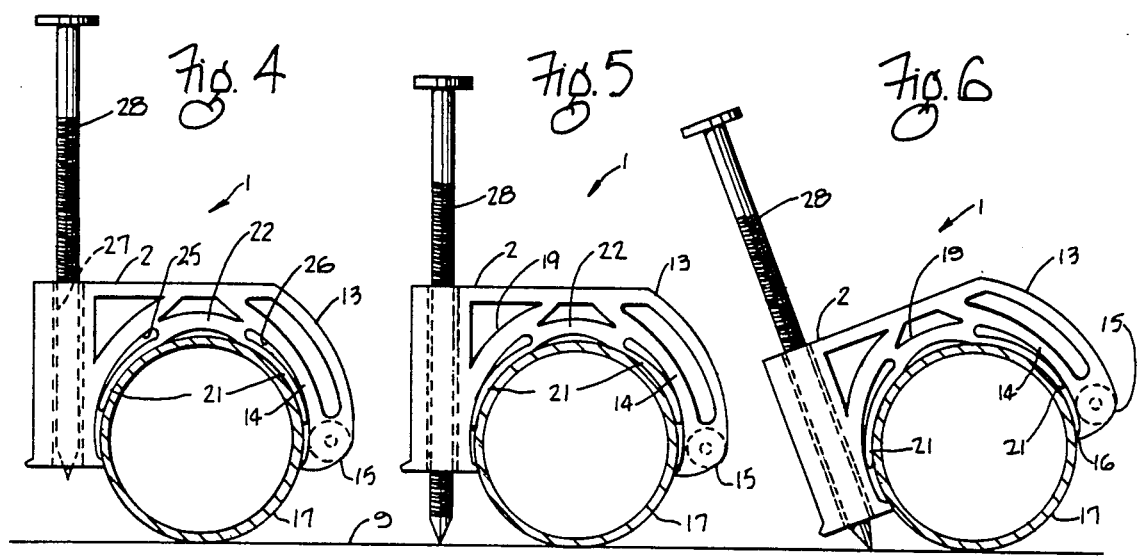
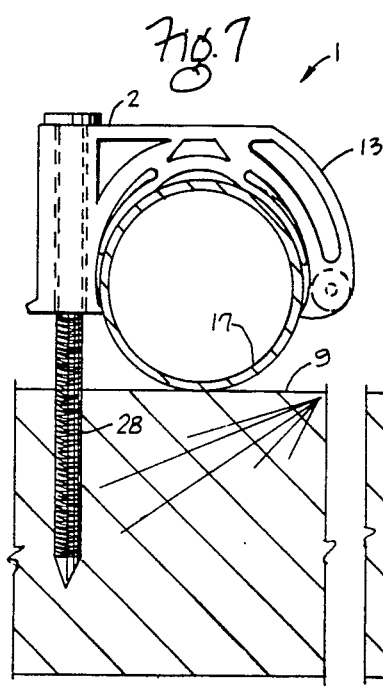
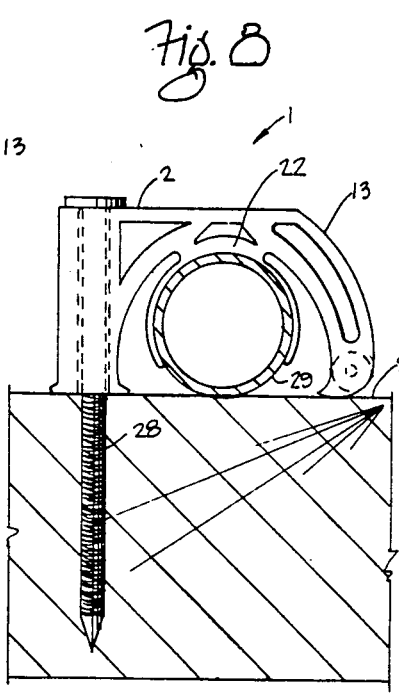
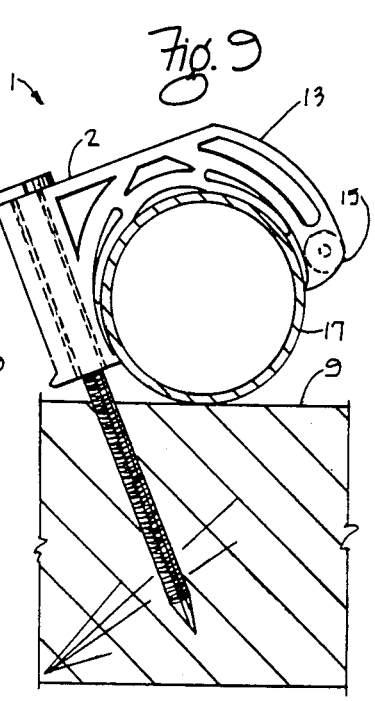

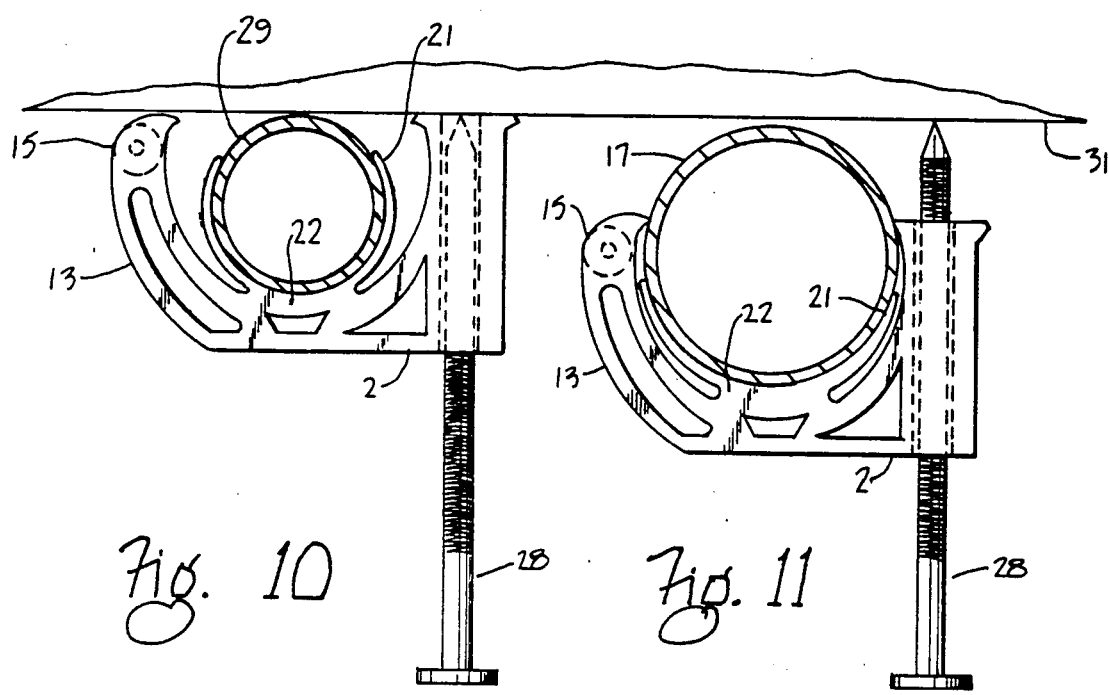

MULTIPLE SIZE TUBING HANGER

FIELD OF THE INVENTION

This invention relates to hangers for supporting tubular objects such as pipes and the like and particularly to such hangers for securely gripping and supporting plumbing pipe in a fixed relationship to a supportive surface.

BACKGROUND OF THE INVENTION

Tubing or pipes must be affixed to and supported from mounting surfaces for running pipe from one location to another. For such pipes used for transporting liquids, such as water, opening and closing of valves or faucets can create a vibration, knocking or the like as shock pressures are conducted through the liquid. This "water hammer" tends to cause movement of the tubing or pipe. Additionally, such tubing or pipes are subject to expansion and contraction as when periodically transporting hot water, thereby also causing movement of the pipes. Mountings supporting the pipe or tubing tend to become loosened or weak by the movement of the pipe relative to a structural support member and may ultimately cease to properly support the pipe. In other instances, the mounting may too tightly restrict movement of the pipe and the pipe is not free to flex relative thereto, resulting in localized metal fatigue, weakened joints and the like. The inventor's previous tubing hanger, disclosed in U.S. Pat. No. 4,260,123, suffices to cure many of the above problems; however, the prior tubing hanger is not ideally suited for securing multiple sizes of pipe.

Standard plumbing tubing is available in ⅜ inch and ⅝ inch outside diameter tubing and the tubing hanger disclosed in the prior '123 patent must be manufactured in two different sizes to match the pipe sizes. The tubing hanger of the instant invention was designed for both pipes, so that a single pipe or conduit hanger has a dual function. This dual function resolves inventory and job site outages because the single size of tubing hanger can be used for both sizes of piping. The instant hanger is sized with respect to the larger diameter of tubing so that the top of the hanger can be installed parallel to the mounting surface or tilted at an angle, such as a 20-25 degree angle to engage or nearly engage the outer surface of the hanger body portion with the mounting surface. Accordingly, the installer can secure the hanger so that the nail or screw drives in straight for aesthetic or functional reasons, such as to line up the fastener with a predrilled hole, or for space considerations, or to use a hammer or screwdriver. The hanger can also be tilted so that the nail or screw is driven in at an angle. The angled installation may be preferred for speed or also for function such as when the fastener is driven counter to the woodgrain for added holding power or to accommodate a space limitation to effectively use the tool.

The preferred material of construction of the tubing hanger is a plastic for no corrosion and less noise when the pipe expands and contracts. The hanger is of such a configuration that a fastener preloaded through the hanger may be overdriven, without crushing or flattening the pipe. Additionally, the hanger is resilient to allow one handed preaffixing of the hanger to the pipe for ease of installation. This "snap on" design acts for both major and minor sizes of tubing, or any two sizes of tubing if the sizes are relatively close together. The "snap on" ability is particularly advantageous for overhead work, as when affixing the pipe to an overhead floor surface or joist.

OBJECTS OF THE INVENTION

The principal objects of the present invention are to provide a pipe or tube hanger for supporting a tube or the like from a mounting surface; to provide such a tube hanger which prevents excessive movement of a pipe relative to the mounting surface while permitting slight amounts of movement; to provide such a tube hanger which can be preaffixed to the pipe to be mounted; to provide such a tube hanger having an arm forming a tube receiving cavity; to provide such a tube hanger which is adapted for use for two different sizes of commonly used piping; to provide such a tubing hanger which can be preaffixed to both major and minor sizes of pipe; to provide such a tubing hanger in which its top surface can be mounted parallel to the support surface for neatness or for a nail or screw through the tubing hanger to be driven straight into a predrilled hole in the mounting surface; to provide such a tubing hanger which can be mounted at an angle for ease of hammering or use of the installation tool; to provide such a tube hanger which is resistant to loosening and the like; to provide such a tubing hanger which prevents the tube from being crushed if its mounting fastener is overdriven; and to provide such a tube hanger which is relatively inexpensive, highly reliable in use and well adapted for its intended purpose.

Other objects and advantages of this invention will become apparent from the following description, taken in connection with the accompanying drawings where are set forth by way of illustration and example, certain embodiments of this invention.

DESCRIPTION OF THE DRAWINGS

FIG. 1 is a front elevational view of a tubing hanger embodying the present invention.

FIG. 2 is an end-view of the tubing hanger taken from the left side of the tubing hanger shown in FIG. 1.

FIG. 3 is an end-view of the tubing hanger taken from the right side of the tubing hanger shown in FIG. 1.

FIG. 4 is an elevational view of the tubing hanger supporting a first diameter of pipe or tubing.

FIG. 5 is the same view as in FIG. 4, but showing a mounting nail driven into a mounting surface and with the tubing hanger positioned parallel to the mounting surface.

FIG. 6 is an elevational view of the tubing hanger supporting a first or larger diameter of piping and shown tilted relative to the mounting surface.

FIG. 7 is an elevational view such as after FIG. 5 and showing the nail driven into the mounting surface.

FIG. 8 is a elevational view showing the tubing hanger supporting a second smaller diameter of pipe and mounted parallel to the mounting surface.

FIG. 9 is an elevational view after FIG. 6 and showing the tubing hanger nail driven into the mounting surface.

FIG. 10 is an elevational view showing the tubing hanger preaffixed about a smaller diameter of pipe and in an overhead position.

FIG. 11 is an elevational view showing the tubing hanger preaffixed about a larger diameter of pipe and in an overhead position.

DESCRIPTION OF THE PREFERRED AND ALTERNATIVE EMBODIMENTS

As required, detailed embodiments of the present invention are disclosed herein, however, it is to be understood that the disclosed embodiments are merely exemplary of the invention which may be embodied in various forms. Therefore, specific functional and structural details disclosed herein are not to be interpreted as limiting, but merely as a basis for the claims and as a representative basis for teaching one skilled in the art to variously employ the present invention in virtually any appropriately detailed structure.

Referring in more detail to the drawings:

Reference numeral 1, FIG. 1 generally indicates a pipe or tubing hanger embodying the present invention and comprising a body portion 2 of resilient, flexible material, such as a plastic, having a base 3 with a downward foot 4 with side flanges 5 and 6. The foot 4 has a flattened lower surface 8 for flush contact with a mounting surface 9 such as a joist or a beam.

The body portion 2 includes an upper surface 11 which in the illustrated example is flat. A flexible, resilient arm 13 extends outwardly from the base 3 generally in a semicircular arc segment. The arm 13 defines a partially enclosed cavity 14 sized for receipt of a first, or major, size of tube, such as a common plumbing conduit of $\frac{7}{8}$ inch outside diameter.

The arm includes a tip end 15 with an end protuberance or lug 16 which engages the surface of the large diameter pipe 17. Preferably the arm 13 is of approximately $\frac{1}{2}$ inch in width, FIG. 3, so that load on the pipe surface 17 is evenly distributed. Thus, the inside surface 18 of the arm 13 forming the cavity 14 evenly cradles the pipe 17. The pipe is gripped between the lug 16 and the flange 6 on the foot 4.

The arm 13 preferably has cavities 19 therein for material conservation and is formed from a suitable plastic for resiliency and non-corrosive properties.

Supplemental fingers 21 are connected to the arm 13 generally at a midpoint 22 of the arm and extend substantially concentrically with the arm 13 into the cavity 14. These interior fingers 21 are composed of left and right fingers 23 and 24 which extend generally in a semicircular arc segment of slightly past 180 degrees. The left and right fingers 23 and 24 are sized to receive and support a smaller, or minor, size of common plumbing tubing, such as $\frac{5}{8}$ inch outside diameter. The midpoint 22 of the arm 13 forms a bridge portion which as shown in FIG. 4, when the tube hanger 1 is gripping a large diameter of conduit or tubing, the midpoint bridge is bowed upwardly. Referring to FIG. 8, when the small diameter of conduit is installed, the resilient midpoint bridge is not bowed, but wholly in contact with the outside surface of the conduit.

The thickness of the fingers 23 and 24 is substantially matched by the amount of protuberance of the flange 6 and the lug 16. When the large diameter tubing 17 is received within the holder 1, as shown in FIG. 4, the fingers 23 and 24 are pushed outwardly into left and right cavities 25 and 26 sized to receive the fingers 23 and 24. The flange 6 and lug 16 remain in contact with the piping outer surface.

The body portion 2 includes a channel 27 for receipt of a fastener such as a ring shank nail 28, as shown in FIGS. 7 and 9. The channel 27 extends through the body portion 2 and is spaced apart from the arm 13 so that a blow on the nail 28 is not transmitted to the tubing received by the arm 13. The effect of this offset relation is that overdriving of the nail 28 does not crush or flatten the tubing. Additionally a space 30 adjacent the body portion 2 permits distortion of the hanger with undue pressure on any tubing encircled by the arm 13.

The tube hanger 1 can be mounted in various positions and the nail 28 driven straight in, FIG. 7, or at an angle, FIG. 9. As shown in FIG. 7, the tube hanger 1 can be mounted with the top surface 11 of the hanger parallel to the mounting surface 9. The installer can secure the hanger so that the nail or screw drives in straight for aesthetic or functional reasons. The functional reason is to line up the nail 28 with a predrilled hole in the mounting surface 9 or for space considerations to swing a hammer or use a screwdriver. Alternatively, the tube hanger 1 may be tilted such as at a 20 to 25 degree angle as shown in FIG. 6. The angled installation is preferred for speed or also for function in order to drive the fastener counter to the set of the wood grain for added holding power or to accommodate space limitations to effectively use the driving tool.

As shown in FIG. 8, when the tube hanger is used for small diameter pipe 29, the foot 4 has its bottom surface 8 flat against the mounting surface 9 and the pipe 29 and tip end 15 are touching the surface 9.

In use, the user simply snaps the tube hanger 1 about any major diameter pipe 17, having then the option to tilt the hanger 1, driving the nail 28 at an angle, or indexing the nail to contact the mounting surface 9 and driving the nail perpendicular to the surface 9. When using the hanger 1 with the smallest diameter pipe 29, the nail 28 can only be driven perpendicular with the surface 9. So retained, the pipe or tube 17 or 29 is affixed adjacent to the mounting or supporting surface 9. This snap-on feature permits one-handed preaffixing and installation by a worker when using the hanger either for major or minor diameter pipes, or any diameter of pipe between the major and minor sizes. The snap-on feature is particularly advantageous when doing overhead installations to an overhead surface which may be a floor undersurface or an overhead joist. The snap on feature permits the workman to install the hanger without a necessity to hold the hanger about the pipe when nailing, FIGS. 10 and 11.

It is to be understood that while one form of this invention has been illustrated and described, it is not to be limited to the specific form or arrangement of parts herein described and shown except in so far as such limitations are included in the following claims.

What is claimed and desired to be secured by Letters Patent is as follows:

1. A tube hanger for selectively supporting at least two different sizes of tubes from a mounting surface and comprising:
  a. a body portion sized to extend transversely across a tube to be supported by said hanger, said body portion having a base end generally for abutment with a support surface and arm means with a tip end extending outwardly from said base end in a semi-circular arc segment, said arm means defining a partially enclosed cavity sized for receipt of a first size of tube; and
  b. supplemental finger means connected to said arm means and extending substantially concentrically with said arm means into said cavity, said supplemental finger means being opposed and sized for cradling and gripping a second size of tube of lesser diameter than said first size of tube.

2. A tube hanger for selectively supporting at least major and minor sizes of tubes from a mounting surface and comprising:
   a. a body portion sized to extend transversely across a tube to be supported by said hanger, said body portion having a base end generally for abutment with a support surface and arm means with a tip end extending outwardly from said base end in a semi-circular arc segment, said arm means defining a partially enclosed cavity sized for receipt of a major size of tube and including means for snap-in receipt of said major size of tube to preaffix said hanger to said major tube; and
   b. supplemental finger means extending oppositely from a mid-portion of said arm means and protruding into said cavity, said supplemental finger means including means for snap-in receipt of a minor size of tube to preaffix said hanger to said minor tube.

3. A tube hanger for selectively supporting at least two sizes of tubes from a mounting surface and comprising:
   a. a body portion sized to extend transversely across a tube to be supported by said hanger, said body portion having a base end generally for abutment with a support surface and arm means with a tip end extending outwardly from said base end in a semi-circular arc segment, said arm means defining a partially enclosed cavity sized for receipt of a first size of tube; and
   b. supplemental finger means extending oppositely from a mid-point of said arm means and curving substantially concentrically with said arm means into said cavity, said supplemental finger means being sized for gripping a second size of tube of lesser diameter than said first size of tube.

4. The tube hanger set forth in claim 3 wherein:
   a. said first size of tube is $\frac{1}{2}''$ O.D. tubing.

5. The tube hanger set forth in claim 3 wherein:
   a. said second size of tube is $\frac{3}{8}''$ O.D. tubing.

6. The tube hanger set forth in claim 3 wherein:
   a. said body portion is of a total height dimension less than the diameter of said first size of tube.

7. The tube hanger set forth in claim 3 wherein:
   a. said tip end includes an inward protuberance for engagement with said first size of tube.

* * * * *